United States Patent
Cheng et al.

(10) Patent No.: US 10,443,780 B2
(45) Date of Patent: Oct. 15, 2019

(54) GRAVITY CENTER ADJUSTMENT MECHANISM AND RELATED CAMERA DEVICE

(71) Applicant: Wistron Corporation, New Taipei (TW)

(72) Inventors: Ting-Yao Cheng, New Taipei (TW); Chen-Pu Yang, New Taipei (TW); Chwen-Tyng Hwang, New Taipei (TW); Ya-Shian Huang, New Taipei (TW); Yi-Ching Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/662,209

(22) Filed: Jul. 27, 2017

(65) Prior Publication Data

US 2018/0299062 A1    Oct. 18, 2018

(30) Foreign Application Priority Data

Apr. 12, 2017   (TW) .............................. 106112110 A (51) Int. Cl.

| | |
|---|---|
| *F16M 11/20* | (2006.01) |
| *H04N 5/225* | (2006.01) |
| *G03B 17/56* | (2006.01) |
| *F16M 11/42* | (2006.01) |
| *F16M 11/18* | (2006.01) |
| *G03B 17/02* | (2006.01) |

(Continued)

(52) U.S. Cl.
CPC ....... *F16M 11/2078* (2013.01); *F16M 11/123* (2013.01); *F16M 11/18* (2013.01); *F16M 11/42* (2013.01); *G03B 17/02* (2013.01); *G03B 17/561* (2013.01); *G03B 29/00* (2013.01); *H04N 5/2251* (2013.01); *H04N 5/2252* (2013.01); *H04N 5/2253* (2013.01); *F16M 2200/041* (2013.01)

(58) Field of Classification Search
CPC .... F16M 11/2078; F16M 11/18; F16M 11/42; H04N 5/2253; H04N 5/2252; G03B 17/561

See application file for complete search history.

(56) References Cited

U.S. PATENT DOCUMENTS

| | | | |
|---|---|---|---|
| 2001/0045019 A1* | 11/2001 | Takeuchi ................. | G01C 9/06 33/366.19 |
| 2010/0263948 A1* | 10/2010 | Couture ................... | B25J 5/005 180/8.2 |

(Continued)

*Primary Examiner* — Gevell V Selby
(74) *Attorney, Agent, or Firm* — Winston Hsu (57) ABSTRACT

A camera device includes a base, an image sensing component and a gravity center adjustment mechanism. The image sensing component is located on the base. The gravity center adjustment mechanism includes a circuit board disposed on the base, an adjusting module and a weight component. An angle detecting unit on the circuit board is used to detect an inclined angle of the circuit board related to a reference surface. The adjusting module is disposed on the circuit board. The weight component is connected to the circuit board via the adjusting module. An processing unit on the circuit board drives the adjusting module to rotate the weight component according to the inclined angle, so as to change position of a gravity center of the camera device and to adjust a capturing angle of the image sensing component.

20 Claims, 10 Drawing Sheets

(51) Int. Cl.
*G03B 29/00* (2006.01)
*F16M 11/12* (2006.01)

(56) References Cited

U.S. PATENT DOCUMENTS

| | | | |
|---|---|---|---|
| 2011/0157397 A1* | 6/2011 | Yoshizumi | G03B 17/38 348/222.1 |
| 2014/0297124 A1* | 10/2014 | Hasegawa | G05D 1/0268 701/41 |
| 2014/0353451 A1* | 12/2014 | Hein | F16M 11/18 248/371 |

* cited by examiner

GRAVITY CENTER ADJUSTMENT MECHANISM AND RELATED CAMERA DEVICE

BACKGROUND OF THE INVENTION

1. Field of the Invention

The present invention relates to a mobile camera device, and more particularly, to a gravity center adjustment mechanism and a related camera device having stable balancing function and capable of utilizing the gravity center adjustment mechanism to adjust a visual angle of the camera device while the camera device moves.

2. Description of the Prior Art

Figure 1:
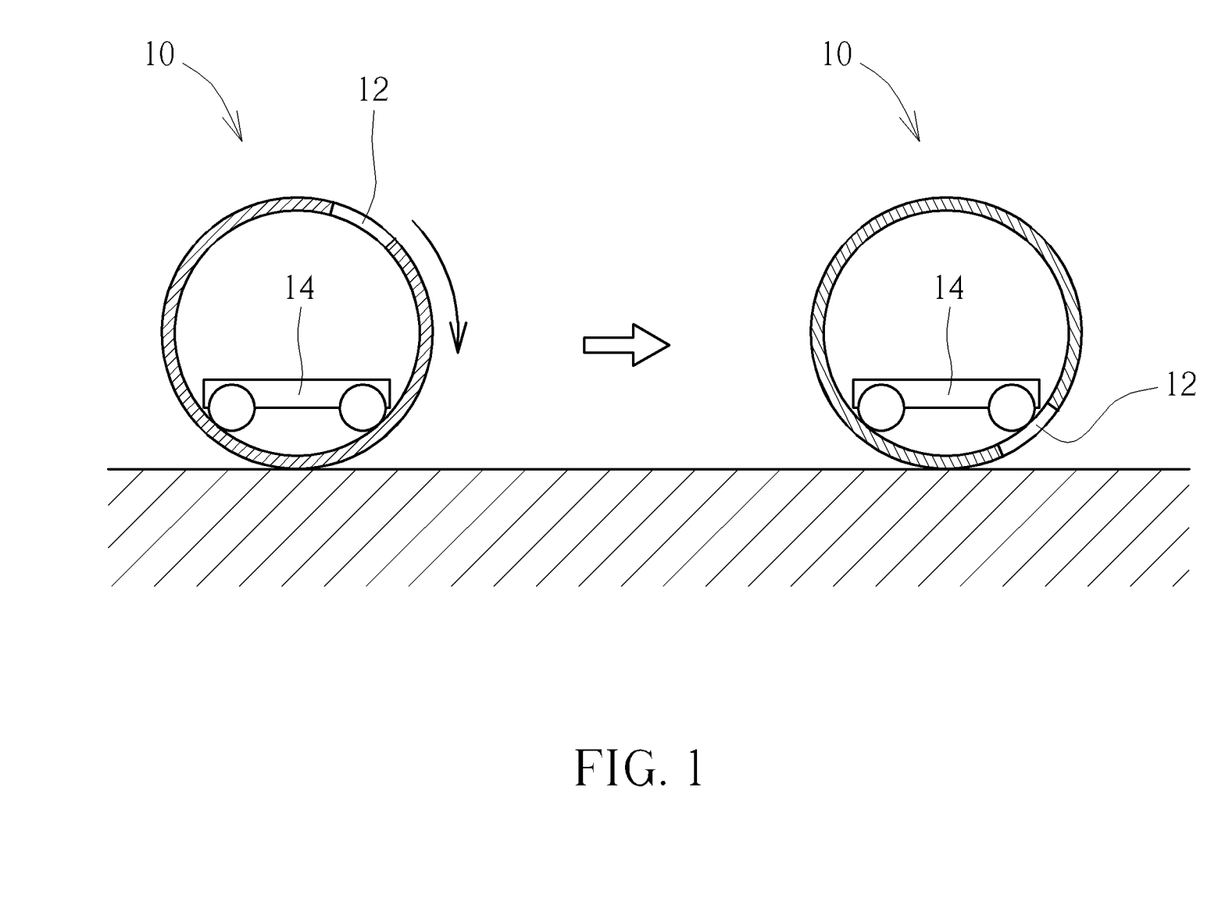
FIG. 1 is a diagram of the camera with a movement of the spherical household robot in prior art.

With the advanced technology, the robot is widespread applied to manufacturing factory and consumer's family life. The household robot can be a vertical robot and a spherical robot. The vertical robot has to overcome coordination of limbs balance, and has a drawback of slow and unstable motion. The spherical robot can rapidly move on the ground and conforms to the ordinary household demand. The conventional spherical household robot includes a camera, the user can remotely control a video capturing function of the spherical household robot, and can monitor interior environment while stays outside, such as being in the office. The camera of the conventional spherical household robot is simultaneously rotated with rolling of the spherical housing. Please refer to FIG. 1. FIG. 1 is a diagram of showing variation of the camera 12 while the spherical household robot 10 moves in prior art. As the wheel set 14 is rotated above an inner wall of the spherical housing, the spherical household robot 10 is moved on the supporting plane, the camera 12 is violently reversed while the conventional spherical household robot 10 is rolled and cannot keep at the specific predetermined vision angle.

SUMMARY OF THE INVENTION

The present invention provides a gravity center adjustment mechanism and a related camera device having stable balancing function and capable of utilizing the gravity center adjustment mechanism to adjust a visual angle of the camera device while the camera device moves for solving above drawbacks.

According to the claimed invention, a gravity center adjustment mechanism includes a circuit board, an adjusting module and a weight component. The circuit board has a processing unit and an angle detecting unit, and the angle detecting unit is utilized to detect an inclined angle of the circuit board relative to a reference surface. The adjusting module is disposed on the circuit board. The weight component is movably connected to the circuit board via the adjusting module. The processing unit drives the adjusting module to move the weight component according to the inclined angle, so as to change a gravity center of an assembly of the circuit board, the adjusting module and the weight component, and to adjust rotation of the circuit board relative to the reference surface.

According to the claimed invention, he weight component is a pendulum, an end of the pendulum has a weight block, and the other end of the pendulum is pivotally connected to the adjusting module.

According to the claimed invention, the adjusting module includes a first counterweight adjusting unit and a second counterweight adjusting unit, the weight component includes a first counterweight portion and a second counterweight portion, and an oscillating variation of the first counterweight portion rotated by the first counterweight adjusting unit is different from an oscillating variation of the second counterweight portion rotated by the second counterweight adjusting unit.

According to the claimed invention, a first rotating direction of the first counterweight portion is identical with or opposite to a second rotating direction of the second counterweight portion.

According to the claimed invention, an included angle is formed between a first rotating direction of the first counterweight portion and a second rotating direction of the second counterweight portion.

According to the claimed invention, the weight component includes a supporting seat and a plurality of weight blocks, the supporting seat has a plurality of accommodating structures, and the plurality of weight blocks having different weight is respectively disposed inside the plurality of accommodating structures.

According to the claimed invention, the adjusting module utilizes an orthogonal gear set to rotate the weight component.

According to the claimed invention, A camera device includes a base, an image sensing component and a gravity center adjustment mechanism. The image sensing component is disposed on the base and utilized to obtain image information. The gravity center adjustment mechanism includes a circuit board, an adjusting module and a weight component. The circuit board has a processing unit and an angle detecting unit, and the angle detecting unit is utilized to detect an inclined angle of the circuit board relative to a reference surface. The adjusting module is disposed on the circuit board. The weight component is movably connected to the circuit board via the adjusting module. The processing unit drives the adjusting module to move the weight component according to the inclined angle, so as to change a gravity center of the camera device and to adjust a capturing angle of the image sensing component.

According to the claimed invention, the camera device further includes a spherical housing and a rolling kit. The base, the image sensing component and the gravity center adjustment mechanism are disposed inside the spherical housing, and image sensing component faces a transparent region of the spherical housing. The rolling kit is disposed on the base and contacts an inner wall of the spherical housing in a rolling manner.

According to the claimed invention, the adjusting module rotates the weight component in a specific direction for guiding the rolling kit to be rolled in the specific direction.

According to the claimed invention, the camera device further includes a control motor disposed on the base and connected to the rolling kit, and the control motor is adapted to drive rotation of the rolling kit.

According to the claimed invention, the camera device further includes a positioning wheel set disposed on a position on the base different from the rolling kit, and contacting the inner wall in the rolling manner.

According to the claimed invention, the camera device further includes an audio sensing component electrically connected to the processing unit, and the processing unit drives rotation of the rolling kit in accordance with a sensing result of the audio sensing component.

According to the claimed invention, the camera device further includes a visual angle adjustment module disposed on the base and adapted to adjust a rotary angle of the image sensing component relative to the base.

The camera device of the present invention utilizes the gravity center adjustment mechanism to execute the angle balancing function. The weight component of the gravity center adjustment mechanism can change the structural gravity center of the camera device while being oscillated or rotated. The pendulum of the weight component can be hanged down to keep the circuit board in the horizontal, and the image sensing component is utilized to obtain the level image; while the pendulum of the weight component is oscillated forward or backward, the circuit board is inclined according to variation of the gravity center, and the scene orientation of the image sensing component can be adjusted accordingly to change the capturing angle. Due to the angle balancing function of the gravity center adjustment mechanism, deviation of the camera device in shift or in oscillation can be amended immediately for preferred scene stability, and roller design of the camera device can be used to expand the special vision angle of the camera lens. The gravity center adjustment mechanism not only can be installed inside the spherical camera device, but also can be applied to a hydro-camera device, an aerial-camera device or any movable camera device. The camera device of the present invention can overcome sudden accident resulted from unstable water flow or airflow to ensure quality stability of the image information. Comparing to the prior art, the camera device of the present invention can keep the camera lens of the image sensing component at the specific vision angle via the gravity center adjustment mechanism no matter how the camera device is oscillated or shaken, and the camera device on the march can continuously execute effective image capturing operation.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
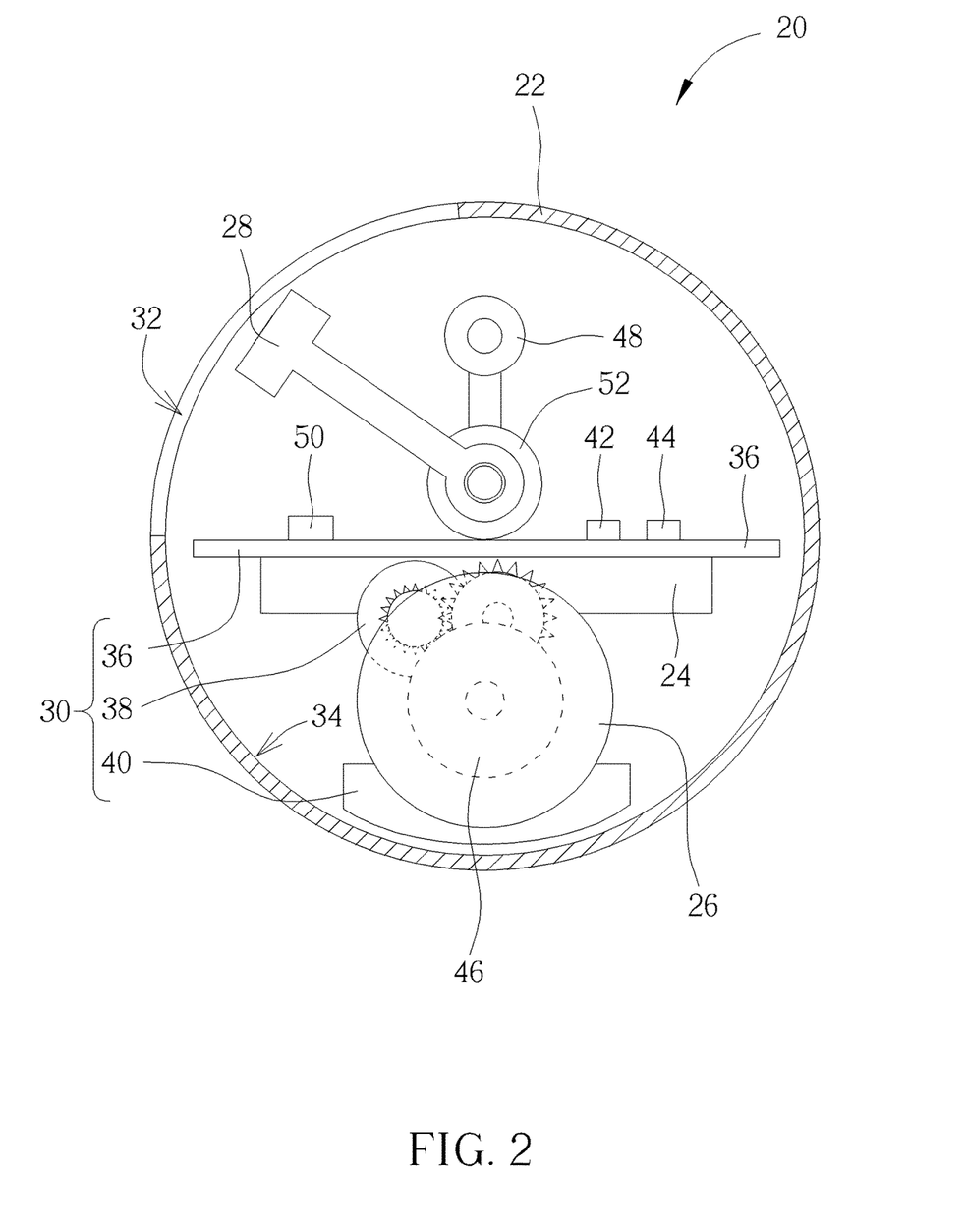
FIG. 2 is a sectional view of a camera device according to a first embodiment of the present invention.
Figure 3:
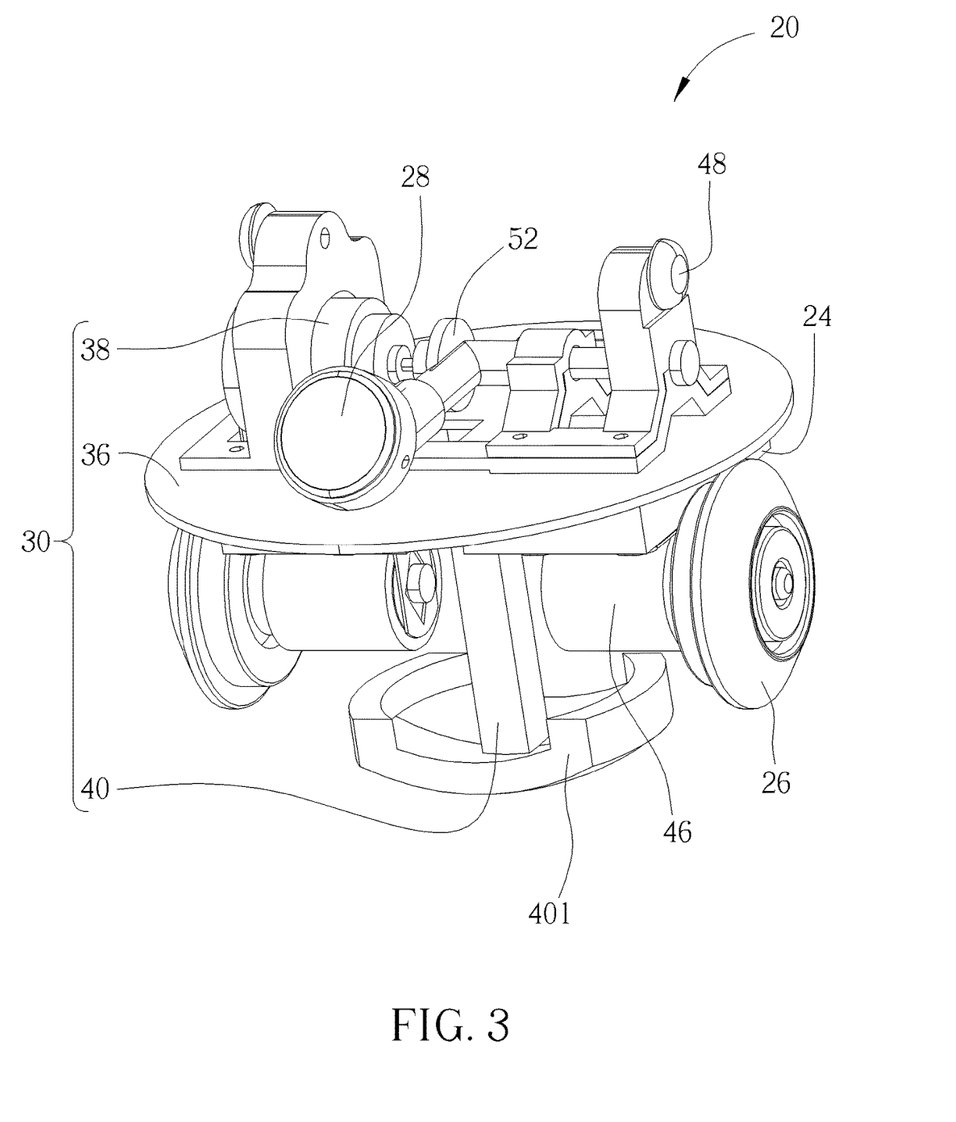
FIG. 3 is a diagram of the camera device according to the first embodiment of the present invention.

Please refer to FIG. 2 and FIG. 3. FIG. 2 is a sectional view of a camera device 20 according to a first embodiment of the present invention. FIG. 3 is a diagram of the camera device 20 according to the first embodiment of the present invention. The camera device 20 can include a spherical housing 22, a base 24, a rolling kit 26, an image sensing component 28 and a gravity center adjustment mechanism 30. The spherical housing 22 is utilized to accommodate elements of the camera device 20 for providing cover protection and preferred aesthetic. The spherical housing 22 has a transparent region 32. The image sensing component 28 is disposed on the base 24 inside the spherical housing 22, a fixing component can be used to fix the image sensing component 28 on the base 24 through the circuit board 36, and an actual assembling position is not limited to the said situation. The image sensing component 28 faces toward the transparent region 32 to obtain image information outside the camera device 20. The rolling kit 26 is disposed on the base 24, and can contact an inner wall 34 of the spherical housing 22 in a rolling manner. The rolling kit 26 is an optional element. For example, while the camera device 20 is put on the table or on the ground, the rolling kit 26 is preferably disposed inside the spherical housing 22 to let the camera device 20 be able to rotate and shift above a supporting plane (the supporting plane can be interpreted as the foresaid table, the ground or any surface whereon the camera device 20 is located). Application of the rolling kit 26 is not limited to the said embodiment, and depends on design demand.

The gravity center adjustment mechanism 30 can include a circuit board 36, an adjusting module 38 and a weight component 40. The circuit board 36 is disposed on the base 24, and can be located above or under the base 24, and further can be integrated with the base 24 monolithically. The circuit board 36 has a processing unit 42 and an angle detecting unit 44. The angle detecting unit 44 is utilized to detect an inclined angle of the circuit board 36 (or the image sensing component 28) relative to the reference surface. Because the image sensing component 28 is connected with the circuit board 36, the angle detecting unit 44 detects the inclined angle of the circuit board 36 relative to the reference surface can be interpreted as detecting the inclined angle of the image sensing component 28 relative to the reference surface. The reference surface is not limited to a specific surface in real; for example, the reference surface can be defined as a horizontal plane relative to the supporting plane, or be set in accordance with an initial putting angle of the circuit board 36 relative to the supporting plane. The weight component 40 can be disposed on the circuit board 36 via the adjusting module 38 in a movable manner. In the first embodiment, the adjusting module 38 can be a rotary motor, and the weight component 40 can be a pendulum. An end of the pendulum is pivotally connected to the rotary motor, and the other end of the pendulum has a weight block 401. The adjusting module 38 can change a gravity center of the camera device 20 by translational movement or rotation of the weight component 40. The camera device 20 can optionally include a control motor 46 disposed on the base 24 and connected to the rolling kit 26. The control motor 46 is utilized to drive rotation of the rolling kit 26, which means driving the rolling kit 26 to roll relative to the inner wall 34, and the camera device 20 can be moved forward and backward above the supporting plane accordingly.

Figure 4:
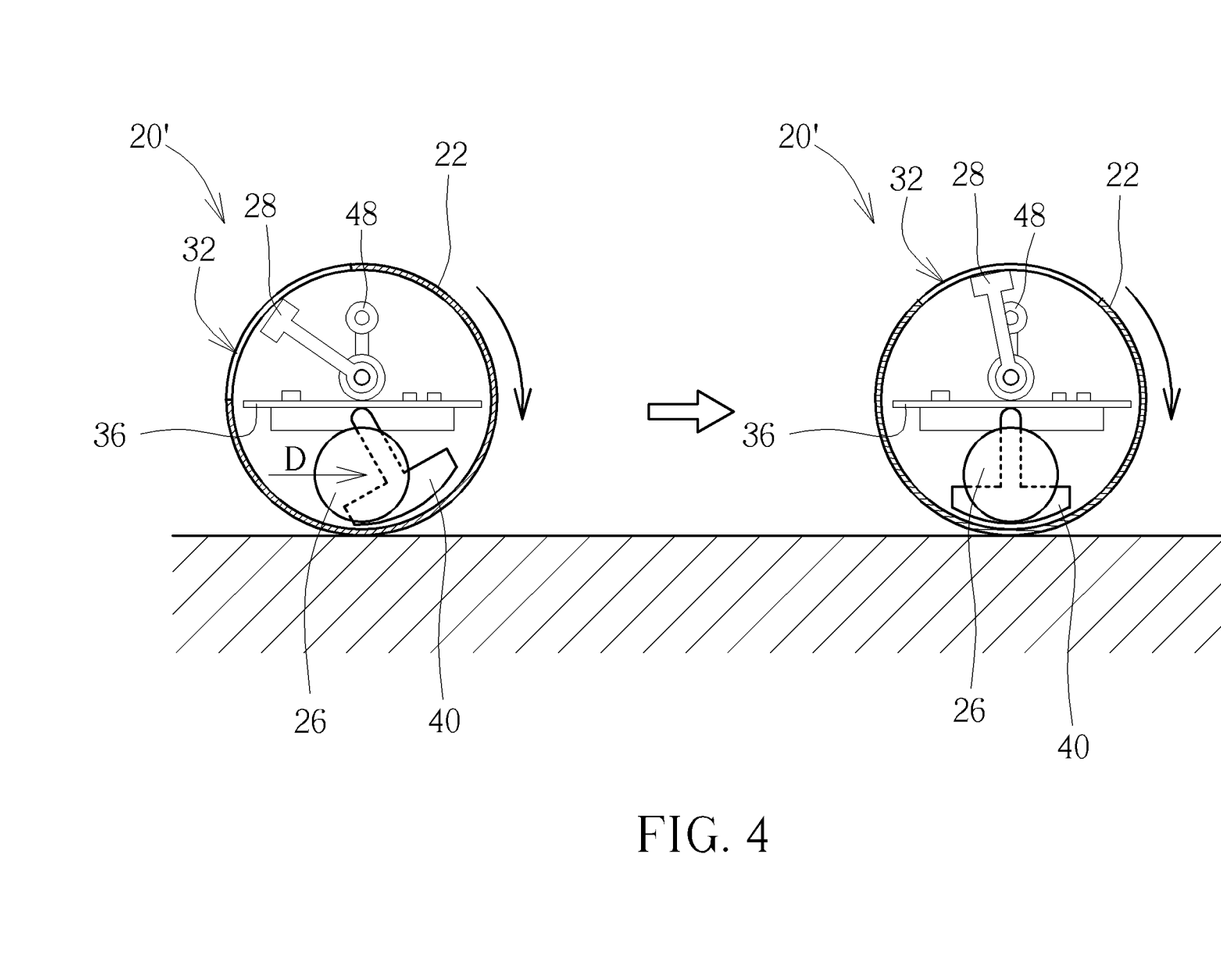
FIG. 4 is a sectional view of the camera device in another type according to the first embodiment of the present invention.

However, the camera device 20 further can drive the rolling kit 26 to roll above the inner wall 34 without the control motor 46. Please refer to FIG. 4. FIG. 4 is a sectional view of the camera device 20' in another type according to the first embodiment of the present invention. Difference between the camera device 20' and the camera device 20 is: the camera device 20' does not dispose the control motor on the rolling kit 26, and the rolling kit 26 cannot rotate actively. The camera device 20' utilizes the adjusting module 38 to oscillate the weight component 40 at a specific direction D (such as oscillating the weight component 40 to a right side shown in left portion of FIG. 4), the gravity center of the camera device 20' is shifted to the right side to rotate the rolling kit 26 at the specific direction D (such as the foresaid right side direction), and the camera device 20' can be rotated at a clockwise direction and shifted to the right side above the supporting plane. The weight component 40 which is oscillated to the specific direction D (such like the right side) can be represented as being rotated at a counterclockwise direction; otherwise, the weight component 40 which is oscillated to the left side can be represented as being rotated at the clockwise direction.

Please refer to FIG. 2 and FIG. 3. The camera device 20 further optionally includes a positioning wheel set 48, an audio sensing component 50 and a visual angle adjustment module 52. The positioning wheel set 48 is disposed on a position of the base 24 relative to the rolling kit 26, and can contact against the inner wall 34 of the spherical housing 22 in a rolling manner. The rolling kit 26 and the positioning wheel set 48 are respectively located on two opposite sides of the base 24 to contact the spherical housing 22, so as to ensure that the base 24 is centred within the spherical housing 22. The audio sensing component 50 is electrically connected to the processing unit 42 and utilized to receive an audio signal outside the spherical housing 22. The processing unit 42 can drive rotation of the rolling kit 26 according to a sensing result of the audio sensing component 50, so as to move the camera device 20 toward and away from the audio source. In addition, the visual angle adjustment module 52 is disposed on the base 24 and utilized to adjust a rotary angle of the image sensing component 28 relative to the base 24, and the image sensing component 28 can freely change its vision angle within a range of the transparent region 32.

Figure 5A:
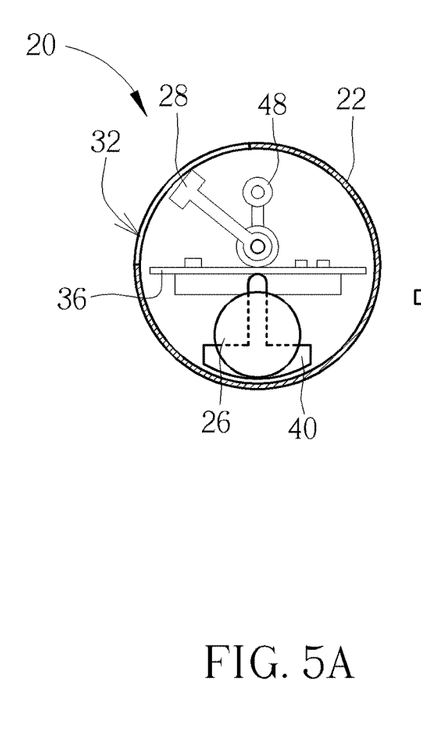
FIG. 5A, FIG. 5B and FIG. 5C respectively are diagrams of the camera device during an immediate amendment process according to the first embodiment of the present invention.
Figure 5B:
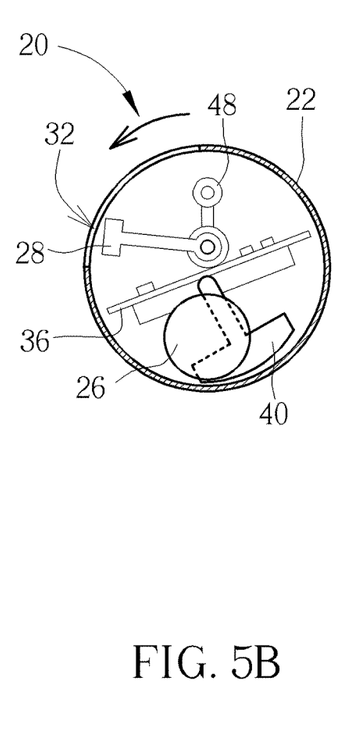
Figure 5C:
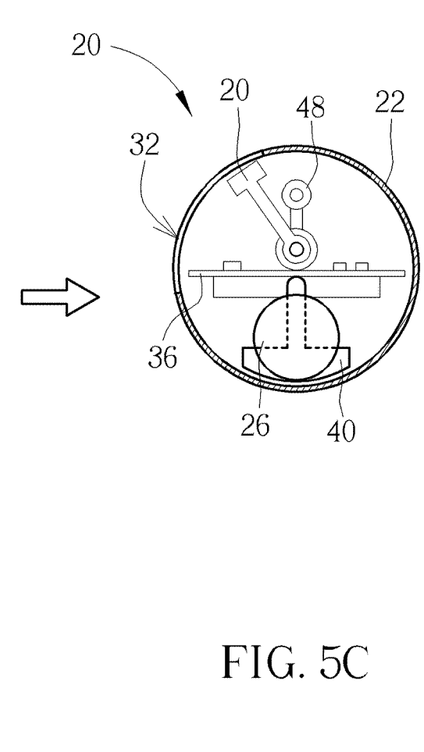

Please refer to FIG. 5A, FIG. 5B and FIG. 5C. FIG. 5A, FIG. 5B and FIG. 5C respectively are diagrams of the camera device 20 during an immediate amendment process according to the first embodiment of the present invention. While the camera device 20 is accelerated or passes through the rough supporting plane, as shown in FIG. 5A and FIG. 5B, inner elements of the camera device 20 are inclined by the centrifugal force, the vision angle of the image sensing component 28 is aberrant, and the angle detecting unit 44 can immediately detect the inclined angle of the inner elements (such like the circuit board 36); then, the processing unit 42 can drive the adjusting module 38 to rotate the weight component 40 according to variation of the inclined angle, as the clockwise rotation shown in FIG. 5B and FIG. 5C, the gravity center of the camera device 20 can be varied rapidly and effectively for inclination amendment, and the image sensing component 28 can be positioned stably and the visual angle adjustment module 52 can be utilized to amend the angle of the image sensing component 28 in accordance with actual demand, for settling the image sensing component 28 toward the monitor orientation.

Figure 6A:
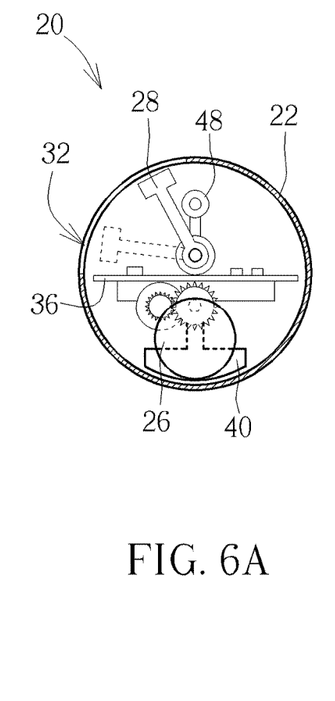
FIG. 6A, FIG. 6B, FIG. 6C, FIG. 6D and FIG. 6E respectively are diagrams of the camera device under the special vision angle adjustment according to the first embodiment of the present invention.
Figure 6B:
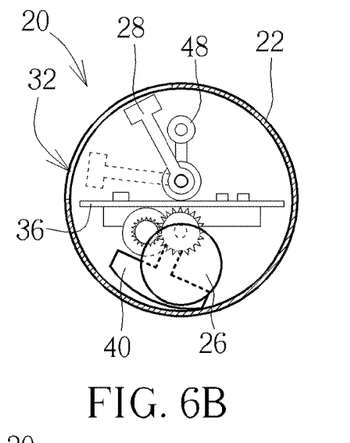
Figure 6C:
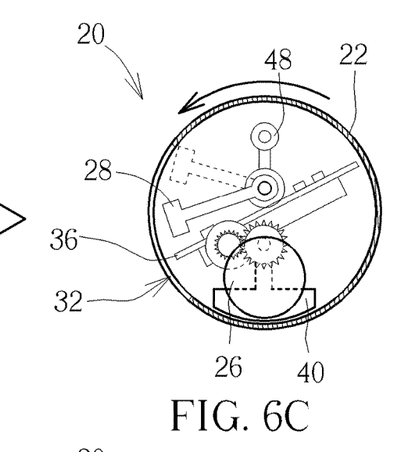
Figure 6D:
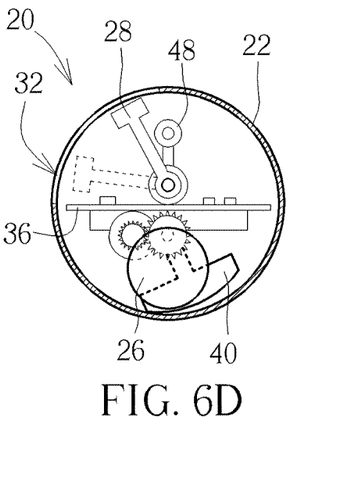
Figure 6E:
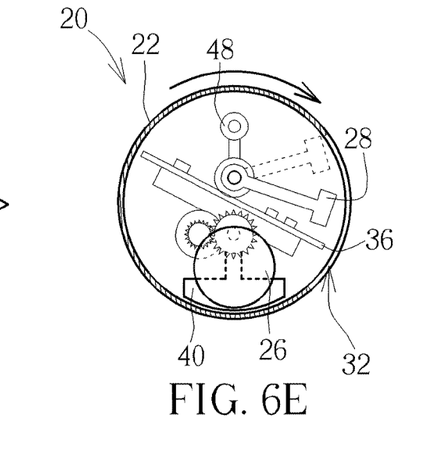

Besides, the gravity center adjustment mechanism 30 can be used to execute the special vision angle adjustment of the image sensing component 28 with the visual angle adjustment module 52. Please refer to FIG. 6A, FIG. 6B, FIG. 6C, FIG. 6D and FIG. 6E. FIG. 6A, FIG. 6B, FIG. 6C, FIG. 6D and FIG. 6E respectively are diagrams of the camera device 20 under the special vision angle adjustment according to the first embodiment of the present invention. As shown in FIG. 6A, the vision angle adjustment of the image sensing component 28 is limited to the range of the transparent region 32. As shown in FIG. 6B and FIG. 6C, the weight component 40 is oscillated to the left side, the gravity center of the camera device 20 is shifted to guide counterclockwise rotation of the spherical housing 22, and an adjustable range of the vision angle of the image sensing component 28 located on the left side of the camera device 20 can be increased accordingly. As shown in FIG. 6D and FIG. 6E, the weight component 40 is oscillated to the right side, the gravity center of the camera device 20 is shifted to guide the clockwise rotation of the spherical housing 22, so as to increase the adjustable range of the vision angle of the image sensing component 28 located on the right side of the camera device 20.

Figure 7:
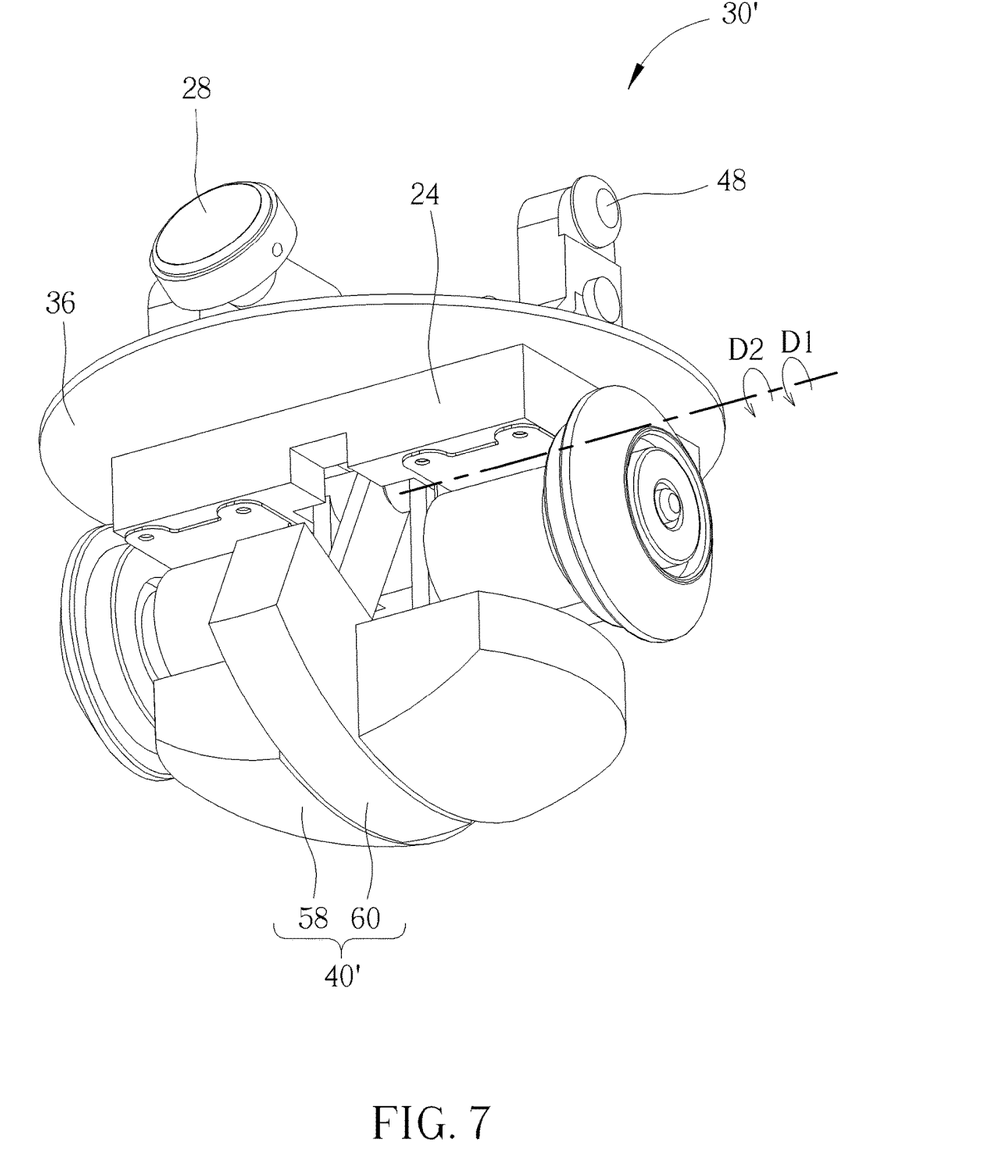
FIG. 7 and FIG. 8 respectively are diagrams of the gravity center adjustment mechanism in different views according to a second embodiment of the present invention.
Figure 8:
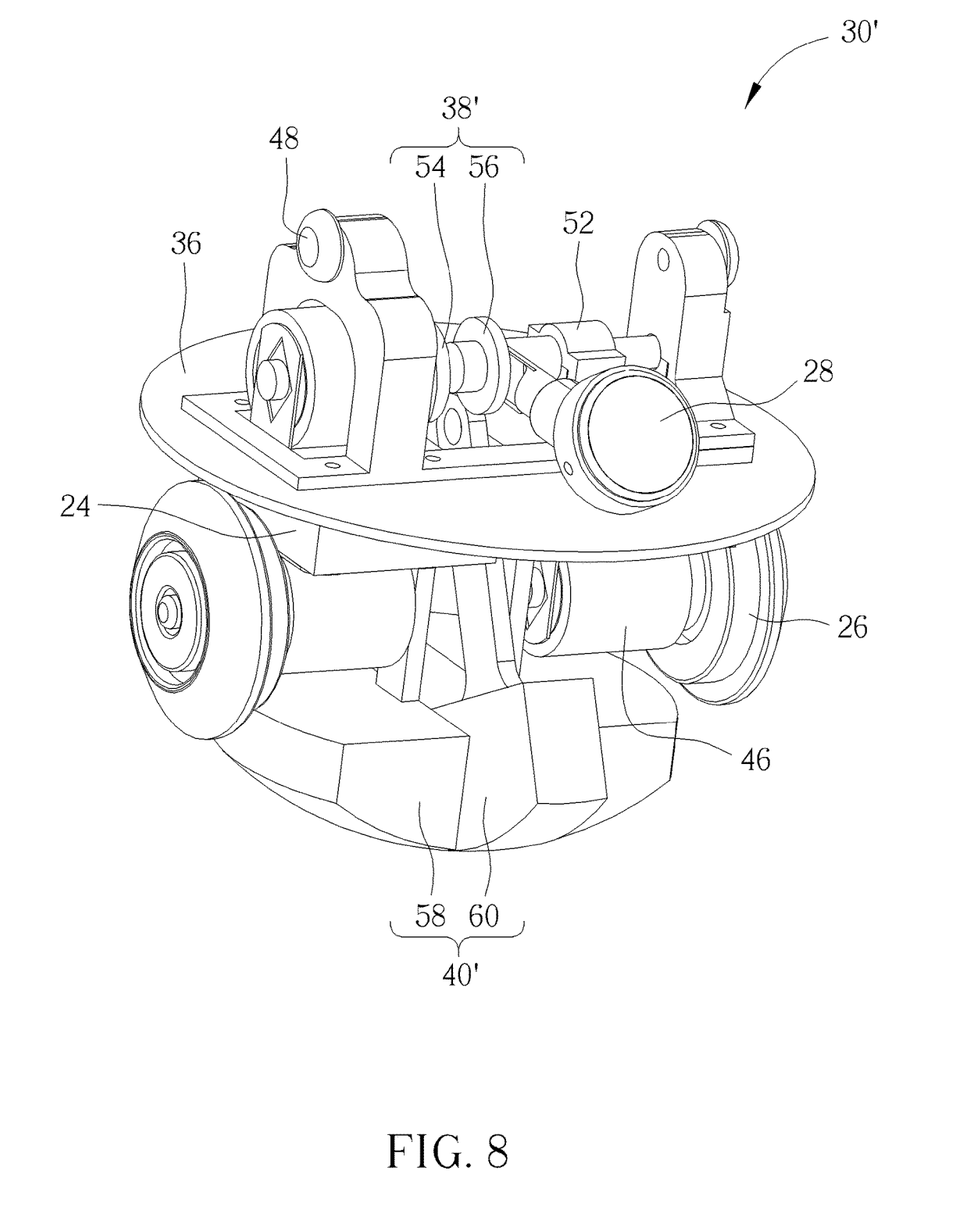

Please refer to FIG. 7 and FIG. 8. FIG. 7 and FIG. 8 respectively are diagrams of the gravity center adjustment mechanism 30' in different views according to a second embodiment of the present invention. In the second embodiment, elements having the same numerals as ones of the first embodiment have the same structures and functions, and a detailed description is omitted herein for simplicity. The adjusting module 38' of the gravity center adjustment mechanism 30' can include a first counterweight adjusting unit 54 and a second counterweight adjusting unit 56, and the weight component 40' can include a first counterweight portion 58 and a second counterweight portion 60. A first rotating direction D1 of the first counterweight portion 58 can be identical with or opposite to a second rotating direction D2 of the second counterweight portion 60. The first counterweight portion 58 is a main adjusting pendulum, the second counterweight portion 60 is an auxiliary adjusting pendulum, and an oscillating variation of the first counterweight portion 58 rotated by the first counterweight adjusting unit 54 is different from an oscillating variation of the second counterweight portion 60 rotated by the second counterweight adjusting unit 56; for example, the oscillating variation can be large and suitable for coarse adjustment, the oscillating variation further can be slight and suitable for fine adjustment. The adjusting module 38' can provide the delicate gravity center adjustment, and can be utilized to replace the visual angle adjustment module 52 of the first embodiment. For example, the processing unit 42 can control the second counterweight adjusting unit 56 to slightly rotate the second counterweight portion 60, the base 24 has small oscillation, and the vision angle of the image sensing component 28 can be slightly adjusted. The adjusting module 38' and the visual angle adjustment module 52 may be both disposed inside the camera device 20.

Figure 9:
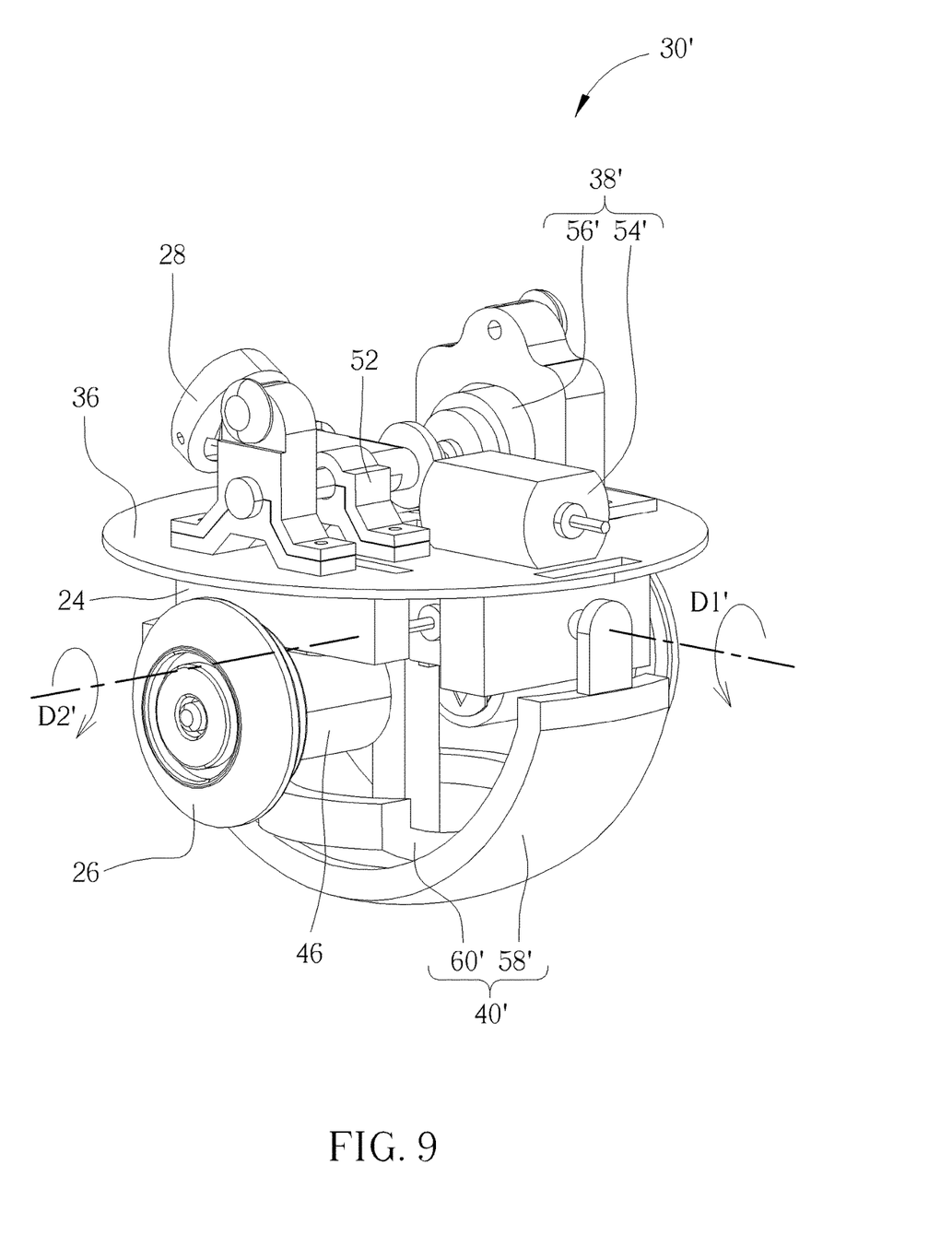
FIG. 9 is diagram of the gravity center adjustment mechanism in another type according to the second embodiment of the present invention.

Please refer to FIG. 9. FIG. 9 is diagram of the gravity center adjustment mechanism 30' in another type according to the second embodiment of the present invention. In the second embodiment, the weight component 40' can include a plurality of counterweight portions with different weight for variable amendment during the gravity center adjustment process. The weight component 40' can include the first counterweight portion 58' and the second counterweight portion 60' shaped as the arc pendulum, and an included angle is formed between the first rotating direction D1' of the first counterweight portion 58' and the second rotating direction D2' of the second counterweight portion 60'. The foresaid included angle can be, but not limited to, ninety degrees in the second embodiment. The first counterweight portion 58' and the second counterweight portion 60' respectively has the first counterweight adjusting unit 54' and the second counterweight adjusting unit 56'. The first counterweight portion 58' is the main adjusting pendulum, the second counterweight portion 60' auxiliary adjusting pendulum, application of the said pendulums are similar to the above-mentioned embodiment, and a detailed description is omitted herein for simplicity.

Figure 10:
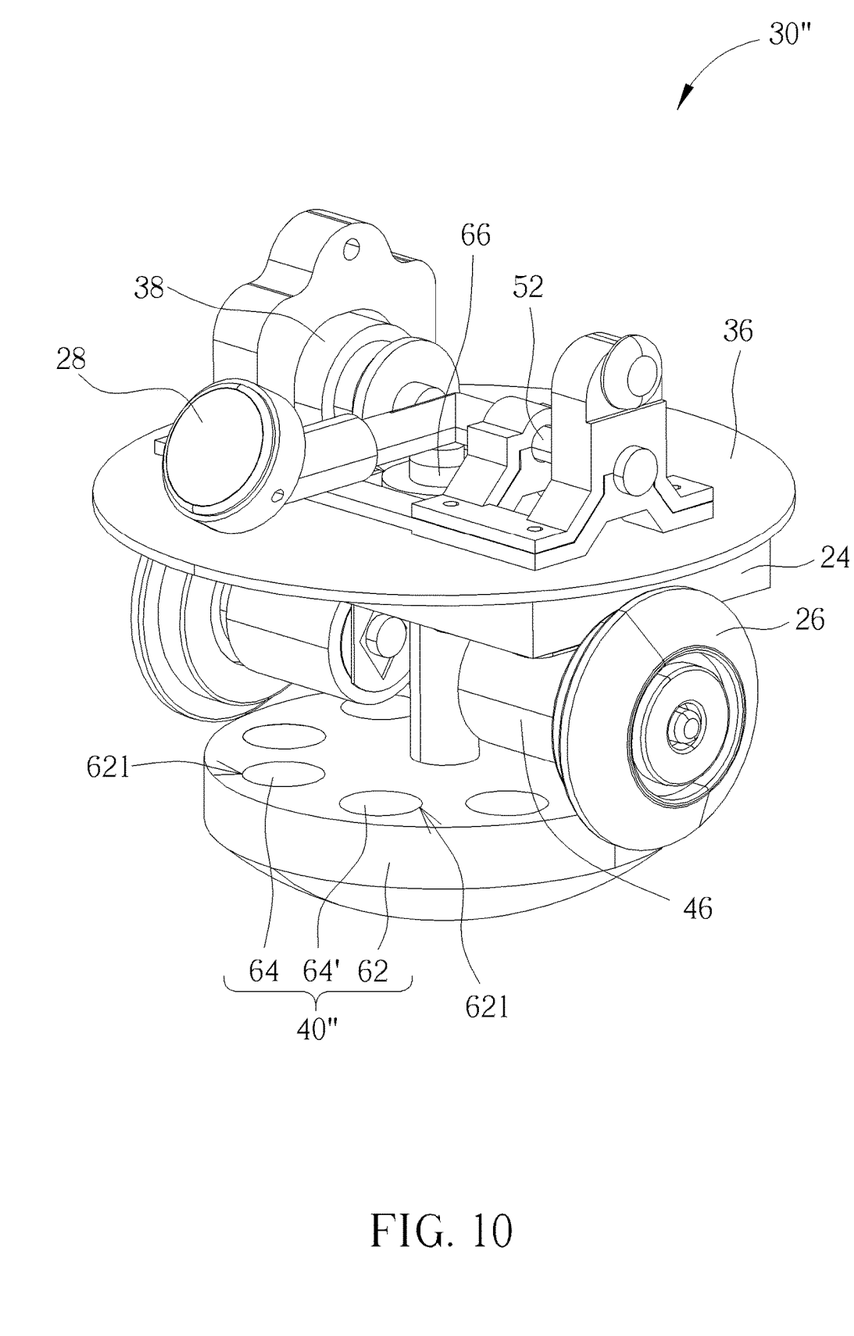
FIG. 10 is a diagram of the gravity center adjustment mechanism according to a third embodiment of the present invention.

Please refer to FIG. 10. FIG. 10 is a diagram of the gravity center adjustment mechanism 30" according to a third embodiment of the present invention. In the third embodiment, elements having the same numerals as ones of the above-mentioned embodiments have the same structures and functions, and a detailed description is omitted herein for simplicity. The weight component 40" of the gravity center adjustment mechanism 30" can include a supporting seat 62 and a plurality of weight blocks 64 and 64'. The plurality of weight blocks 64 and 64' may have individual weight, and can be respectively disposed inside a plurality of accommodating structures 621 of the supporting seat 62. The adjusting module 38 can drive oscillation of the weight component 40", or utilize an orthogonal gear set 66 to rotate the weight component 40". The weight component 40" can be oscillate or rotated by the adjusting module 38 to change the structural gravity center of the camera device for the inclination amendment.

In conclusion, the camera device of the present invention utilizes the gravity center adjustment mechanism to execute the angle balancing function. The weight component of the gravity center adjustment mechanism can change the structural gravity center of the camera device while being oscillated or rotated. The pendulum of the weight component can be hanged down to keep the circuit board in the horizontal, and the image sensing component is utilized to obtain the level image; while the pendulum of the weight component is oscillated forward or backward, the circuit board is inclined according to variation of the gravity center, and the scene orientation of the image sensing component can be adjusted accordingly to change the capturing angle. Due to the angle balancing function of the gravity center adjustment mechanism, deviation of the camera device in shift or in oscillation can be amended immediately for preferred scene stability, and roller design of the camera device can be used to expand the special vision angle of the camera lens. The gravity center adjustment mechanism not only can be installed inside the spherical camera device, but also can be applied to a hydro-camera device, an aerial-camera device or any movable camera device. The camera device of the present invention can overcome sudden accident resulted from unstable water flow or airflow to ensure quality stability of the image information. Comparing to the prior art, the camera device of the present invention can keep the camera lens of the image sensing component at the specific vision angle via the gravity center adjustment mechanism no matter how the camera device is oscillated or shaken, and the camera device on the march can continuously execute effective image capturing operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gravity center adjustment mechanism, comprising:
    a circuit board, having a processing unit and an angle detecting unit, the angle detecting unit being utilized to detect an inclined angle of the circuit board relative to a reference surface;
    an adjusting module disposed on the circuit board; and
    a weight component movably connected to the circuit board via the adjusting module, the processing unit determining a rotary angle of the weight component based on change of the inclined angle and then driving the adjusting module to move the weight component to the determined rotary angle when the inclined angle is changed, and to adjust rotation of the circuit board relative to the reference surface.

2. The gravity center adjustment mechanism of claim 1, wherein the weight component is a pendulum, an end of the pendulum has a weight block, and the other end of the pendulum is pivotally connected to the adjusting module.

3. The gravity center adjustment mechanism of claim 1, wherein the adjusting module comprises a first counterweight adjusting unit and a second counterweight adjusting unit, the weight component comprises a first counterweight portion and a second counterweight portion, an oscillating variation of the first counterweight portion rotated by the first counterweight adjusting unit is different from an oscillating variation of the second counterweight portion rotated by the second counterweight adjusting unit.

4. The gravity center adjustment mechanism of claim 3, wherein a first rotating direction of the first counterweight portion is identical with or opposite to a second rotating direction of the second counterweight portion.

5. The gravity center adjustment mechanism of claim 3, wherein an included angle is formed between a first rotating direction of the first counterweight portion and a second rotating direction of the second counterweight portion.

6. The gravity center adjustment mechanism of claim 1, wherein the weight component comprises a supporting seat and a plurality of weight blocks, the supporting seat has a plurality of accommodating structures, and the plurality of weight blocks having different weight is respectively disposed inside the plurality of accommodating structures.

7. The gravity center adjustment mechanism of claim 6, wherein the adjusting module utilizes an orthogonal gear set to rotate the weight component.

8. A camera device, comprising:
    a base;
    an image sensing component disposed on the base and utilized to obtain image information; and
    a gravity center adjustment mechanism, comprising:
        a circuit board disposed on the base, the circuit board having an processing unit and an angle detecting unit, the angle detecting unit being utilized to detect an inclined angle of the circuit board relative to a reference surface;
        an adjusting module disposed on the circuit board; and
        a weight component movably connected to the circuit board via the adjusting module, the processing unit determining a rotary angle of the weight component based on change of the inclined angle and then driving the adjusting module to move the weight component to the determined rotary angle when the inclined angle is changed and to adjust a capturing angle of the image sensing component.

9. The camera device of claim 8, further comprising:
    a spherical housing where inside the base, the image sensing component and the gravity center adjustment mechanism are disposed, the image sensing component facing a transparent region of the spherical housing; and a rolling kit disposed on the base and contacting an inner wall of the spherical housing in a rolling manner.

10. The camera device of claim 9, wherein the adjusting module rotates the weight component in a specific direction for guiding the rolling kit to be rolled in the specific direction.

11. The camera device of claim 9, further comprising:

a control motor disposed on the base and connected to the rolling kit, the control motor being adapted to drive rotation of the rolling kit.

12. The camera device of claim 9, further comprising:

a positioning wheel set disposed on a position on the base different from the rolling kit, and contacting the inner wall in the rolling manner.

13. The camera device of claim 9, further comprising:

an audio sensing component electrically connected to the processing unit, the processing unit driving rotation of the rolling kit in accordance with a sensing result of the audio sensing component.

14. The camera device of claim 8, further comprising:

a visual angle adjustment module disposed on the base and adapted to adjust a rotary angle of the image sensing component relative to the base.

15. The camera device of claim 8, wherein the weight component is a pendulum, an end of the pendulum has a weight block, and the other end of the pendulum is pivotally connected to the adjusting module.

16. The camera device of claim 8, wherein the adjusting module comprises a first counterweight adjusting unit and a second counterweight adjusting unit, the weight component comprises a first counterweight portion and a second counterweight portion, an oscillating variation of the first counterweight portion rotated by the first counterweight adjusting unit is different from an oscillating variation of the second counterweight portion rotated by the second counterweight adjusting unit.

17. The camera device of claim 16, wherein a first rotating direction of the first counterweight portion is identical with or opposite to a second rotating direction of the second counterweight portion.

18. The camera device of claim 16, wherein an included angle is formed between a first rotating direction of the first counterweight portion and a second rotating direction of the second counterweight portion.

19. The camera device of claim 8, wherein the weight component comprises a supporting seat and a plurality of weight blocks, the supporting seat has a plurality of accommodating structures, and the plurality of weight blocks having different weight is respectively disposed inside the plurality of accommodating structures.

20. The camera device of claim 19, wherein the adjusting module utilizes an orthogonal gear set to rotate the weight component.

* * * * *